(12) United States Patent
Shi et al.

(10) Patent No.: US 10,632,925 B2
(45) Date of Patent: Apr. 28, 2020

(54) REAR-VIEW MIRROR AND METHOD FOR ADJUSTING REFLECTIVITY OF THE SAME

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventors: Bo Shi, Beijing (CN); Yuanming Feng, Beijing (CN); Xiongcan Zuo, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 427 days.

(21) Appl. No.: 15/711,849

(22) Filed: Sep. 21, 2017

(65) Prior Publication Data

US 2018/0229659 A1 Aug. 16, 2018

(30) Foreign Application Priority Data

Feb. 16, 2017 (CN) .......................... 2017 1 0083330

(51) Int. Cl.
*B60R 1/08* (2006.01)
*B60R 1/04* (2006.01)

(52) U.S. Cl.
CPC ................ *B60R 1/088* (2013.01); *B60R 1/04* (2013.01)

(58) Field of Classification Search
CPC .................................. B60R 1/088; B60R 1/04
See application file for complete search history.

(56) References Cited

FOREIGN PATENT DOCUMENTS

GB            1031115 A  *  5/1966  ............. B60R 1/089

* cited by examiner

*Primary Examiner* — Wen Huang
(74) *Attorney, Agent, or Firm* — Kinney & Lange P.A.

(57) ABSTRACT

The present disclosure provides a rear-view mirror and a method for adjusting the reflectivity thereof. The rear-view mirror includes: a partially transmissive and partially reflective layer which has a light incidence surface for receiving external light, wherein one part of the external light reaching the light incidence surface is reflected and the other part is transmitted through the partially transmissive and partially reflective layer; and a reflective layer arranged at a side of the partially transmissive and partially reflective layer opposite to the light incidence surface, the reflective layer having a light reflection surface which is configured to at least partly reflect the light transmitted through the partially transmissive and partially reflective layer back to it, wherein an optical distance between the light incidence surface of the partially transmissive and partially reflective layer and the light reflection surface of the reflective layer is adjustable.

20 Claims, 2 Drawing Sheets

REAR-VIEW MIRROR AND METHOD FOR ADJUSTING REFLECTIVITY OF THE SAME

CROSS-REFERENCE TO RELATED APPLICATION

This application claims benefit of the Chinese Patent Application No. 201710083330.5, filed with SIPO on Feb. 16, 2017, which is incorporated herein by reference in its entirety.

BACKGROUND OF THE DISCLOSURE

Technical Field

The present disclosure relates to the technical field of rear-view mirrors, and in particular, to a rear-view mirror for an automobile vehicle and a method for adjusting reflectivity of the rear-view mirror.

Description of Related Art

A rear-view mirror for an automobile vehicle is an important tool by which a driver acquires external information of the automobile vehicle directly. In order to prevent accident during driving the vehicle to protect security of humans, all of countries prescribe the rear-view mirror must be mounted on the automobile vehicle as a main means for avoiding accidents. However, when the rear vehicles switch on front high beams in night driving, the driver may become blind due to dazzling caused by the strong light from a light source having been refracted by the rear-view mirror. Even if the light source for dazzling has been removed, the residual image in eyes will still cause blind spots in eyes. Such phenomenon is called the "white spot effect". Such effect may reduce reaction time of the driver by 1.4 seconds. If the vehicle runs normally at 60 miles per hour, it will means the driver drives blindly for about 30 meters, which can increase risk of driving significantly.

SUMMARY

An embodiment of the present disclosure provides a rear view mirror including:

a partially transmissive and partially reflective layer which has a light incidence surface for receiving external light, wherein one part of the external light reaching the light incidence surface is reflected and the other part is transmitted through the partially transmissive and partially reflective layer; and a reflective layer arranged at a side of the partially transmissive and partially reflective layer opposite to the light incidence surface, the reflective layer having a light reflection surface which is configured to at least partly reflect the light having been transmitted through the partially transmissive and partially reflective layer back to the partially transmissive and partially reflective layer, wherein an optical distance between the light incidence surface of the partially transmissive and partially reflective layer and the light reflection surface of the reflective layer is adjustable.

In an embodiment, a separation distance between the light incidence surface of the partially transmissive and partially reflective layer and the light reflection surface of the reflective layer is adjustable.

In an embodiment, the rear-view mirror further includes a separation distance adjusting device configured to adjust the separation distance between the light incidence surface of the partially transmissive and partially reflective layer and the light reflection surface of the reflective layer to change phase difference between light reflected by the partially transmissive and partially reflective layer and light reflected by the reflective layer.

In an embodiment, the separation distance adjusting device includes a flexible connection belt, filling liquid and a storing and transporting device, and wherein the flexible connection belt is elastic and connected to periphery of the partially transmissive and partially reflective layer and periphery of the reflective layer, to form a sealed space between the partially transmissive and partially reflective layer and the reflective layer;

wherein the sealed space is filled with the filling liquid; and wherein the storing and transporting device is configured to add the filling liquid into the sealed space or to extract the filling liquid from the sealed space.

In an embodiment, the storing and transporting device includes a two-way pump, a pipe and a filling liquid reservoir, and wherein a connection portion is provided on the flexible connection belt and two ends of the pipe are respectively connected to the connection portion and an output end of the two-way pump;

wherein the two-way pump has an input end connected to the filling liquid reservoir; and wherein the filling liquid reservoir is configured to store the filling liquid.

In an embodiment, the filling liquid has same refractivity as the partially transmissive and partially reflective layer.

In an embodiment, the separation distance adjusting device further includes a light intensity sensing device and a processor, wherein the light intensity sensing device is configured to detect an intensity of light reaching the partially transmissive and partially reflective layer, to convert it into an electrical signal and to send it to the processor; and wherein the processor is configured to determine whether the intensity is greater than a predetermined intensity threshold from the electrical signal or not, and in response to the intensity greater than the predetermined intensity threshold, the processor is configured to control the storing and transporting device to add the filling liquid into the sealed space to increase the separation distance between the partially transmissive and partially reflective layer and the reflective layer; otherwise, in response to the intensity not greater than the predetermined intensity threshold, the processor is configured to control the storing and transporting device to extract the filling liquid from the sealed space to reduce the separation distance between the partially transmissive and partially reflective layer and the reflective layer.

In an embodiment, the rear-view mirror has an actual reflectivity satisfying:

$$a \geq e \geq a - b*c$$

where a is reflectivity of the partially transmissive and partially reflective layer; b is transmissivity of the partially transmissive and partially reflective layer; c is reflectivity of the reflective layer; and e is the actual reflectivity of the rear-view mirror.

In an embodiment, a separation distance between the light incidence surface of the partially transmissive and partially reflective layer and the light reflection surface of the reflective layer satisfies:

$$d = (\lambda/2 + m\lambda)/2n_2,$$

where λ is a wavelength of visible light; $n_2$ is refractivity of the light incidence surface of the partially transmissive and partially reflective layer; m is an integer; and d is the separation distance between the light incidence surface of the partially transmissive and partially reflective layer and the light reflection surface of the reflective layer.

In an embodiment, the wavelength λ of visible light is equal to 550 nm.

In an embodiment, an anti-reflection film is provided on the light incidence surface of the partially transmissive and partially reflective layer.

In an embodiment, reflectivity of the reflective layer is adjustable.

In an embodiment, the reflective layer includes:

a reflective substrate;

an electrochromism reflective film arranged on the reflective substrate, wherein the electrochromism reflective film has reflectivity which is changeable depending on a voltage applied to the electrochromism reflective film.

In an embodiment, a liquid crystal layer is provided between the partially transmissive and partially reflective layer and the reflective layer and the liquid crystal layer has adjustable refractivity.

An embodiment of the present disclosure provides a method for adjusting reflectivity of a rear-view mirror as described above, including:

adjusting separation distance between the light incidence surface of the partially transmissive and partially reflective layer and the light reflection surface of the reflective layer to change phase difference between light reflected by the partially transmissive and partially reflective layer and light reflected by the reflective layer.

In an embodiment, the adjusting the separation distance between the light incidence surface of the partially transmissive and partially reflective layer and the light reflection surface of the reflective layer includes:

forming an expandable or shrinkable sealed space between the partially transmissive and partially reflective layer and the reflective layer;

filling the sealed space with filling liquid; and adding the filling liquid into the sealed space to increase the separation distance or extracting the filling liquid from the sealed space to reduce the separation distance.

In an embodiment, the adding the filling liquid into the sealed space to increase the separation distance or extracting the filling liquid from the sealed space to reduce the separation distance further includes:

detecting intensity of light reaching the partially transmissive and partially reflective layer; and determining whether the intensity is greater than a predetermined intensity threshold or not, and in response to the intensity greater than the predetermined intensity threshold, adding the filling liquid into the sealed space to increase the separation distance between the partially transmissive and partially reflective layer and the reflective layer; otherwise, in response to the intensity not greater than the predetermined intensity threshold, extracting the filling liquid from the sealed space to reduce the separation distance between the partially transmissive and partially reflective layer and the reflective layer.

DETAILED DESCRIPTION

The exemplified embodiments of the present disclosure will below be explained more comprehensively with reference to drawings such that objects, technical solutions and advantages of the present disclosure become more explicit. Further adaptive embodiments and scope will become apparent from the description provided in the present disclosure. It should be understood that features in the respective embodiments of the present disclosure may be implemented separately or in combination with one or more other embodiments. It should also be understood that the description and specific embodiments of the present disclosure are intended to explain the present disclosure, instead of limiting the scope of the present disclosure.

In addition, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In order that the skilled person in the art can understand the technical solution of the present disclosure more explicitly, a rear-view mirror and a method for adjusting reflectivity of the rear-view mirror provided by the present disclosure will be described in details below with reference to drawings.

Figure 1:
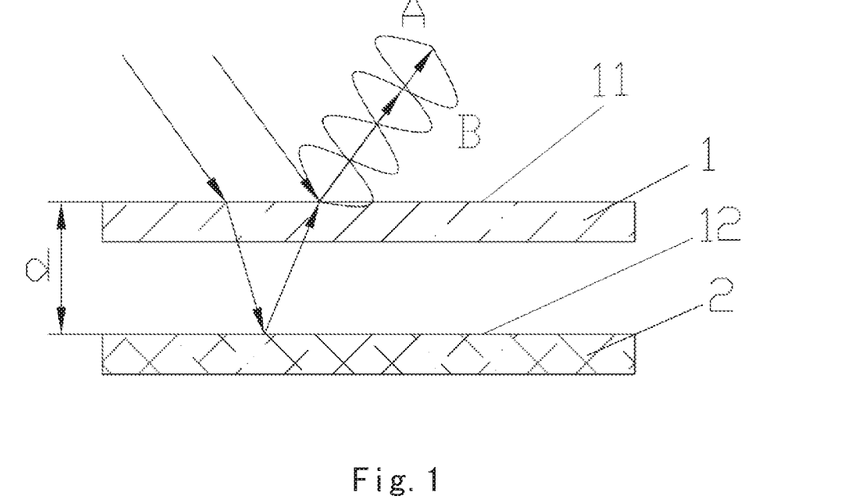
FIG. 1 is a schematic view showing a structure of a rear-view mirror according to an embodiment of the present disclosure.

FIG. 1 is a schematic view showing a structure of a rear-view mirror according to an embodiment of the present disclosure. As shown in FIG. 1, the rear-view mirror includes a partially transmissive and partially reflective layer 1 and a reflective layer 2. They are arranged to be spaced from each other in front-and-rear direction with reference to a front face (facing up in FIG. 1) of the rear-view mirror. The partially transmissive and partially reflective layer 1 has a light incidence surface 11 for receiving external light. When the external light propagates on the light incidence surface 11 of the partially transmissive and partially reflective layer 1, one part of the external light is reflected and the other part is transmitted through the partially transmissive and partially reflective layer 1. Considering the difference in refractivity between the partially transmissive and partially reflective layer 1 and the external environment, the light transmitted through the partially transmissive and partially reflective layer 1 may be refracted. The light transmitted through the partially transmissive and partially reflective layer 1 is directed to a light reflection surface 12 of the reflective layer 2. The light reflection surface 12 is configured to at least partly reflect the light having been transmitted through the partially transmissive and partially reflective layer 1 back to the partially transmissive and partially reflective layer 1. Finally, the light reflected by the light reflection surface 12 is transmitted through the light incidence surface 11 of the partially transmissive and partially reflective layer 1 again to return to initial medium (such as external environment). The light A reflected by the partially transmissive and partially reflective layer 1 and the light B reflected by the reflective layer 2 are superposed with each other to form interference when they enter the initial medium, that is, the incident light beam is reflected by the light incidence surface of the partially transmissive and partially reflective layer 1 and by the light reflection surface 12 of the reflective layer 2 to be formed into two sub-beams, respectively. The two sub-beams produce optical interference with each other, such as destructive interference.

In an example, an optical distance between the light incidence surface 11 of the partially transmissive and partially reflective layer 1 and the light reflection surface 12 of the reflective layer 2 is adjustable. The optical distance means that product of distance by which light travels in medium and refractivity of the medium. The optical distance between the light incidence surface 11 of the partially transmissive and partially reflective layer 1 and the light reflection surface 12 of the reflective layer 2 may be represented by $n_2 d$, if the refractivity is fixed and denoted by $n_2$, where d is a separation distance between the light incidence surface 11 of the partially transmissive and partially reflective layer 1 and the light reflection surface 12 of the reflective layer 2. The difference between optical path lengths of the above two sub-beams in fact is double of the optical distance between the light incidence surface 11 of the partially transmissive and partially reflective layer 1 and the light reflection surface 12 of the reflective layer 2, i.e., $2n_2 d$. If the refractivity is not constant, for example, the refractivity of the medium between the partially transmissive and partially reflective layer 1 and the reflective layer 2 is different from that of the partially transmissive and partially reflective layer 1, the optical distance between the light incidence surface 11 of the partially transmissive and partially reflective layer 1 and the light reflection surface 12 of the reflective layer 2 will be derived by calculating the optical distance in the partially transmissive and partially reflective layer 1 and the optical distance in the medium between the partially transmissive and partially reflective layer 1 and the reflective layer 2 respectively and adding them.

The extent to which two sub-beams produce destructive interference depends on their phase difference. The phase difference is equal to difference in optical path lengths multiplied by $(2\pi/\lambda)$. The phase difference of the two sub-beams depends on the separation distance between the light incidence surface 11 of the partially transmissive and partially reflective layer 1 and the light reflection surface 12 of the reflective layer 2, that is, $$\delta = \frac{2\pi \cdot 2n_2 d}{\lambda} \quad \text{(Equation 1)}$$

where $\delta$ is phase difference between two sub-beams; $n_2$ is refractivity of the partially transmissive and partially reflective layer 1; $\lambda$ is wavelength of the incident light; and d is the separation distance between the light incidence surface 11 of the partially transmissive and partially reflective layer 1 and the light reflection surface 12 of the reflective layer 2.

From Equation 1, it can be determined that the phase difference $\delta$ between two sub-beams may be changed by adjusting the separation distance d, so as to adjust the extent to which two sub-beams produce destructive interference. In accordance with the condition of destructive interference, it can be known that the phase difference $\delta=(2m+1)\pi$, if $2n_2 d=\lambda/2+m\lambda$ and m is an integer. At this time, the two sub-beams are counteracted with each other completely and thus the intensity of light reflected by the rear-view mirror back to the external environment is the weakest. The extent of the destructive interference may be changed by adjusting the separation distance d. Thus, the intensity of light reflected by the rear-view mirror to the external environment may change.

As an example, the separation distance between the light incidence surface 11 of the partially transmissive and partially reflective layer 1 and the light reflection surface 12 of the reflective layer 2 is adjustable. The intensity of the light reflected by rear-view mirror may be adjusted dynamically by adjusting the separation distance.

In an example, the rear-view mirror as described in the embodiment of the present disclosure further includes a separation distance adjusting device 40 configured to adjust the separation distance d between the light incidence surface 11 of the partially transmissive and partially reflective layer 1 and the light reflection surface 12 of the reflective layer 2. In accordance with the above principle of destructive interference, the difference in optical path lengths of the light A reflected by the partially transmissive and partially reflective layer 1 and the light B reflected by the reflective layer 2 may be adjusted by adjusting the separation distance d between the light incidence surface 11 of the partially transmissive and partially reflective layer 1 and the light reflection surface 12 of the reflective layer 2 by means of the separation distance adjusting device 40. In this way, the extent of the destructive interference produced by the lights reflected by the rear-view mirror to the external environment may be changed to achieve adjusting of the actual reflectivity of the rear-view mirror. For example, within a certain range of numerical values, the larger the separation distance between the light incidence surface 11 of the partially transmissive and partially reflective layer 1 and the light reflection surface 12 of the reflective layer 2 is, the stronger the extent of the destructive interference becomes and the smaller the actual reflectivity becomes. In this way, the intensity of the light reflected by the rear-view mirror may be dynamically adjusted to improve the anti-dazzling effect efficiently and enhance the safety of the vehicle in running.

The wavelength of the visible light is in a range of 380 nm to 780 nm. In this range, the light which is the most sensitive to eyes of the human is the light with the wavelength of 550 nm. When the light with the wavelength of 550 nm is counteracted by interference to the largest extent, the whole intensity of the light may be weaken to the largest extent, so as to improve the anti-dazzling effect efficiently. In view of this, it may calculate the separation distance between the light incidence surface 11 of the partially transmissive and partially reflective layer 1 and the light reflection surface 12 of the reflective layer 2 in case that the light with the wavelength of 550 nm is counteracted by interference to the largest extent. In particular, the separation distance may satisfy the following equation:

$$d=(\lambda/2+m\lambda)/2n_2 \quad \text{(Equation 2)}$$

where $\lambda$ is wavelength of the visible light; $n_2$ is refractivity of the partially transmissive and partially reflective layer 1; m is an integer; and d is the separation distance between the light incidence surface 11 of the partially transmissive and partially reflective layer 1 and the light reflection surface 12 of the reflective layer 2. If $\lambda=550$ nm, then $d=(550/2+m*550)/2n_2$. By means of adjusting the separation distance d to this numerical value by the separation distance adjusting device, the light with the wavelength of 550 nm may be counteracted by interference to the largest extent, so as to achieve better anti-dazzling effect. It should be noted that the integer m may be a relatively large value for convenience of accurate control. However, the embodiments of the present disclosure are not limited to adjusting the separation distance d with reference to the wavelength of 550 nm. For example, the separation distance d may also be adjusted with reference to any wavelength within the range of visible light.

Figure 2:
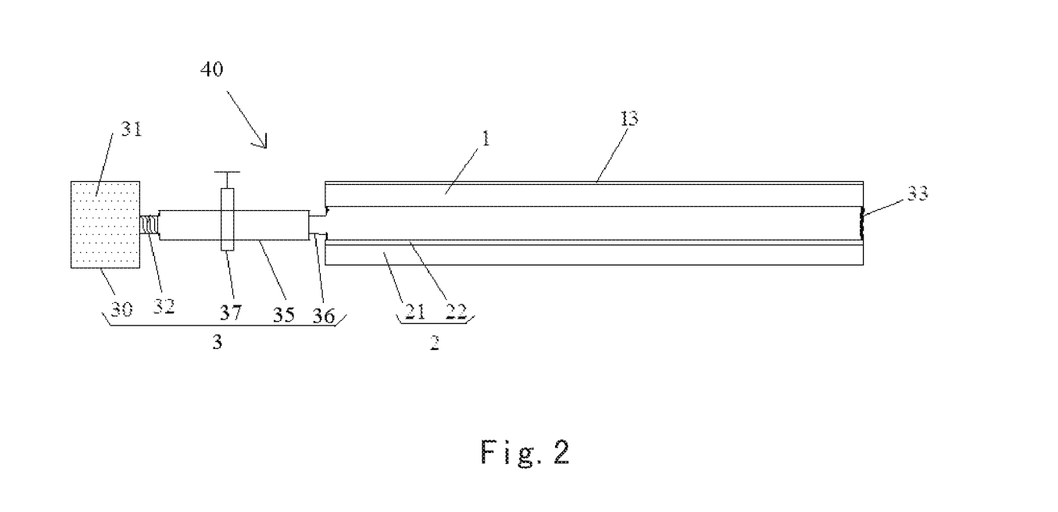
FIG. 2 is a schematic view showing a structure of a rear-view mirror according to an embodiment of the present disclosure.

The embodiments of the above separation distance adjusting device 40 will be explained in details below. In particular, FIG. 2 shows an example of the separation distance adjusting device 40. As seen in FIG. 2, as an example, the separation distance adjusting device 40 includes a flexible connection belt 33, filling liquid 31 and a storing and transporting device 3. The flexible connection belt 33 is elastic and is connected to periphery of the partially transmissive and partially reflective layer 1 and periphery of the reflective layer 2, to form a sealed space between the partially transmissive and partially reflective layer 1 and the reflective layer 2. Since the flexible connection belt 33 is elastic, the sealed space may be expanded or reduced. The filling liquid 31 is used to fill the sealed space, for example, fill the sealed space fully. The storing and transporting device 3 is configured to add the filling liquid 31 into the sealed space or to extract the filling liquid 31 from the sealed space. When the storing and transporting device 3 adds the filling liquid 31 into the sealed space, the flexible connection belt 33 produces stretching deformation to expand the sealed space such that the separation distance between the light incidence surface 11 of the partially transmissive and partially reflective layer 1 and the light reflection surface 12 of the reflective layer 2 is enhanced. When the storing and transporting device 3 extracts the filling liquid 31 from the sealed space, the flexible connection belt 33 produces deflation deformation to deflate the sealed space such that the separation distance between the light incidence surface 11 of the partially transmissive and partially reflective layer 1 and the light reflection surface 12 of the reflective layer 2 is reduced. Thus, the separation distance between the light incidence surface 11 of the partially transmissive and partially reflective layer 1 and the light reflection surface 12 of the reflective layer 2 may be adjusted by adding the filling liquid 31 into the sealed space or extracting the filling liquid 31 from the sealed space by means of the storing and transporting device 3.

As an example, an anti-reflection film 13 is provided on the light incidence surface 11 of the partially transmissive and partially reflective layer 1. The anti-reflection film 13 may be made from materials such as an APF anti-reflection film.

In an example, the filling liquid 31 has refractivity which is same to refractivity of the partially transmissive and partially reflective layer 1. It may prevent the light entering the filling liquid 31 from being refracted.

For example, in an embodiment, the storing and transporting device 3 may include a two-way pump (for example two-way mechanical pump), a pipe 35 and a filling liquid reservoir 30. A connection portion 36 is provided on the flexible connection belt 33 and two ends of the pipe 35 are respectively connected to the connection portion 36 and an output end of the two-way pump 32. For convenience of operation, a valve 37 may be provided on the pipe 35 to control the pipe 35 to switch on or off. The two-way pump 32 has an input end connected to the filling liquid reservoir 30. The filling liquid reservoir 30 is configured to store the filling liquid 31.

Figure 3:
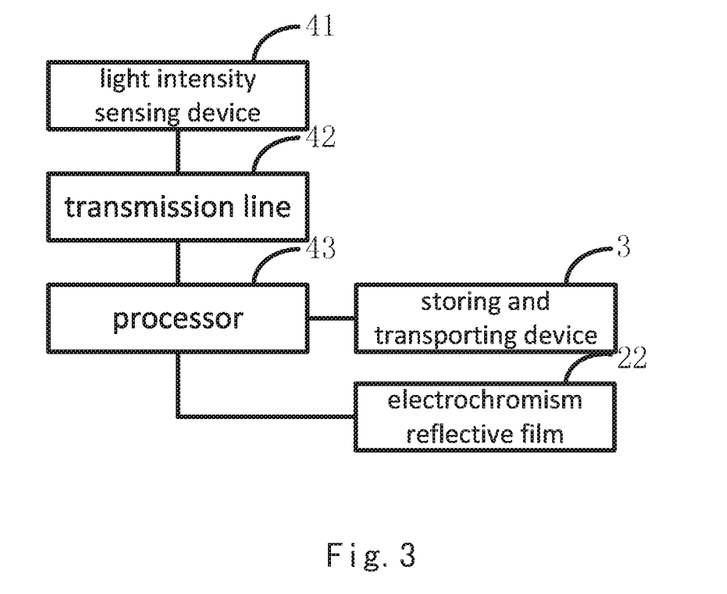
FIG. 3 is a block diagram showing a principle of a rear-view mirror according to an embodiment of the present disclosure.

FIG. 3 is a block diagram showing a principle of a rear-view mirror according to an embodiment of the present disclosure. Referring to FIG. 3, in order that the separation distance between the light incidence surface 11 of the partially transmissive and partially reflective layer 1 and the light reflection surface 12 of the reflective layer 2 may be adjusted in real time depending on specific conditions to dynamically adjust intensity of light reflected by the rear-view mirror so as to enhance the anti-dazzling effect to the largest extent, the separation distance adjusting device 40 further includes a light intensity sensing device 41 (such as a photo detector) and a processor (such as a central processor) 43. The light intensity sensing device 41 is connected to the processor 43 via a transmission line 42 and configured to detect intensity of light reaching the partially transmissive and partially reflective layer 1, to convert it into an electrical signal and to send it to the processor 43. The processor 43 is configured to determine whether the intensity is greater than a predetermined intensity threshold from the electrical signal or not, and if the intensity is greater than a predetermined intensity threshold from the electrical signal, the processor 43 will be configured to control the storing and transporting device 3 to add the filling liquid 31 into the sealed space to enhance the separation distance between the light incidence surface 11 of the partially transmissive and partially reflective layer 1 and the light reflection surface 12 of the reflective layer 2; otherwise, if the intensity is not greater than the predetermined intensity threshold, the processor 43 will be configured to control the storing and transporting device 3 to extract the filling liquid 31 from the sealed space to reduce the separation distance between the light incidence surface 11 of the partially transmissive and partially reflective layer 1 and the light reflection surface 12 of the reflective layer 2.

As an example, the reflectivity of the reflective layer 2 may be adjustable. For example, as shown in FIG. 2, the reflective layer 2 may include: a reflective substrate 21 and an electrochromism reflective film 22 arranged on the reflective substrate 21. The electrochromism reflective film 22 has reflectivity which is changeable depending on voltage applied to the electrochromism reflective film 22. The reflectivity of the electrochromism reflective film 22 may be adjusted by energizing or de-energizing the electrochromism reflective film 22, that is, when the electrochromism reflective film 22 is energized, color of the electrochromism reflective film 22 applied with voltage may change. The higher the voltage applied to the electrochromism reflective film 22 is, the deeper the color of the electrochromism reflective film 22 becomes and the darker the reflected light becomes; otherwise, the lower the voltage applied to the electrochromism reflective film 22 is, the lighter the color of the electrochromism reflective film 22 becomes and the brighter the reflected light becomes.

As an example, when the processor 43 determines the intensity of light is greater than the predetermined intensity threshold, the electrochromism reflective film 22 will be energized; otherwise, the electrochromism reflective film 22 will be de-energized.

As an example, the rear-view mirror has an actual reflectivity satisfying:

$$a \geq e \geq a - b*c$$

where a is reflectivity of the partially transmissive and partially reflective layer 1; b is transmissivity of the partially transmissive and partially reflective layer 1; c is reflectivity of the reflective layer 2; and e is the actual reflectivity of the rear-view mirror. It may be achieved by increasing or reducing the separation distance between the light incidence surface 11 of the partially transmissive and partially reflective layer 1 and the light reflection surface 12 of the reflective layer 2 by means of the processor 43.

As the above separation distance d may be adjusted continuously in real-time, in practice, the reflectivity of the rear-view mirror may be adjusted infinitely in real-time within the range of the above actual reflectivity of the rear-view mirror as required. In this way, while the anti-dazzling effect is enhanced, the driver can clearly see the scene behind the vehicle from the rear-view mirror even in dark environment, so as to improve safety of driving the vehicle.

Instead of adjusting the actual reflectivity of the rear-view mirror by adjusting the separation distance between the light incidence surface 11 of the partially transmissive and partially reflective layer 1 and the light reflection surface 12 of the reflective layer 2, the actual reflectivity of the rear-view mirror may also be adjusted by changing refractivity of medium between the partially transmissive and partially reflective layer 1 and the reflective layer 2. It can be seen from the above Equation (1) that the phase difference between two sub-beams which are desired to produce interference not only depends on the separation distance between the light incidence surface 11 of the partially transmissive and partially reflective layer 1 and the light reflection surface 12 of the reflective layer 2, but also depends on the refractivity of the medium.

Figure 4:
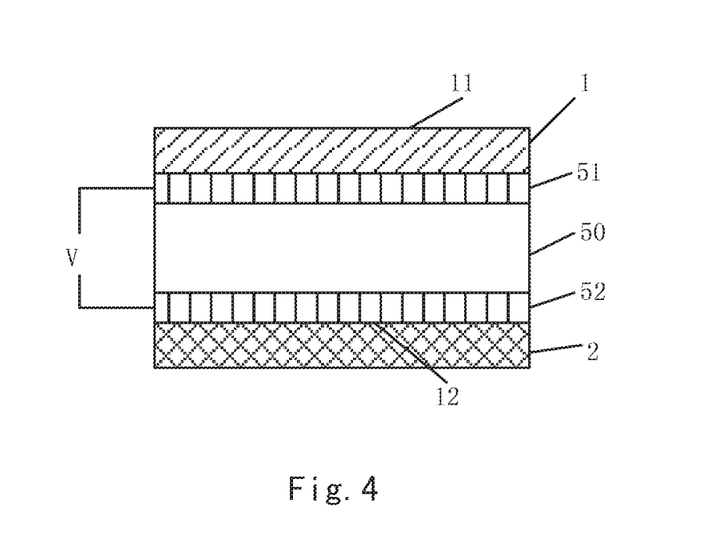
FIG. 4 is a schematic view showing a rear-view mirror according to another embodiment of the present disclosure.

FIG. 4 is a schematic view showing a structure of a rear-view mirror according to another embodiment of the present disclosure. In FIG. 4, a liquid crystal layer 50 is arranged between the partially transmissive and partially reflective layer 1 and the reflective layer 2. The liquid crystal layer 50 has adjustable refractivity. Due to the electro-optic effect of liquid crystals, the refractivity of the liquid crystal layer 50 may change depending on magnitude of voltage applied across both sides of the liquid crystal layer 50. In order to adjust the refractivity of the liquid crystal layer 50, for example, a first electrode 51 and a second electrode 52 may be arranged on both sides of the liquid crystal layer 50 respectively. From the above Equations (1) and (2), it can be seen that, similar to the principle of solution of adjusting the separation distance between the light incidence surface 11 of the partially transmissive and partially reflective layer 1 and the light reflection surface 12 of the reflective layer 2, the phase difference between two sub-beams may change by adjusting refractivity, to adjust the extent of the destructive interference, so as to change the intensity of light reflected by the rear-view mirror. In this way, the anti-dazzling effect may be enhanced efficiently to improve safety of driving vehicle. Further, the intensity of light reflected by the rear-view mirror may also be adjusted dynamically by changing the voltage applied across both sides of the liquid crystal layer 50 in real-time.

The present disclosure also provides a method for adjusting reflectivity of a rear-view mirror. The structure of the rear-view mirror may be same to the rear-view mirror as described in any one of the above embodiments. Its specific details will be omitted herein. The method for adjusting reflectivity of the rear-view mirror includes:

adjusting the separation distance between the light incidence surface of the partially transmissive and partially reflective layer and the light reflection surface of the reflective layer to change phase difference between light reflected by the partially transmissive and partially reflective layer and light reflected by the reflective layer. It may change the extent of the destructive interference produced by them.

By adjusting the separation distance, the difference in optical path lengths of the light A reflected by the partially transmissive and partially reflective layer 1 and the light B reflected by the reflective layer 2 may be adjusted in real-time as required, to change the extent of the destructive interference produced by the reflected lights, so as to adjust the actual reflectivity of the rear-view mirror. In this way, the intensity of light reflected by the rear-view mirror may be adjusted dynamically to enhance the anti-dazzling effect efficiently to improve safety of driving vehicle. Within a certain range of separation distance, the larger the separation distance between the light incidence surface 11 of the partially transmissive and partially reflective layer 1 and the light reflection surface 12 of the reflective layer 2 is, the stronger the extent of the destructive interference and the lower the actual reflectivity becomes.

In an embodiment, adjusting the separation distance between the light incidence surface 11 of the partially transmissive and partially reflective layer 1 and the light reflection surface 12 of the reflective layer 2 may in particular include:

forming an expandable or shrinkable sealed space between the partially transmissive and partially reflective layer 1 and the reflective layer 2;

filling the sealed space with filling liquid (for example filling the sealed space with filling liquid fully); and adding the filling liquid into the sealed space to enhance the separation distance or extracting the filling liquid from the sealed space to reduce the separation distance.

When the filling liquid is added into the sealed space, the sealed space is expanded, so as to enhance the separation distance between the light incidence surface 11 of the partially transmissive and partially reflective layer 1 and the light reflection surface 12 of the reflective layer 2. When the filling liquid is extracted from the sealed space, the sealed space is deflated, so as to reduce the separation distance between the light incidence surface 11 of the partially transmissive and partially reflective layer 1 and the light reflection surface 12 of the reflective layer 2. Thus, the separation distance between the light incidence surface 11 of the partially transmissive and partially reflective layer 1 and the light reflection surface 12 of the reflective layer 2 may be adjusted by adding the filling liquid into the sealed space or extracting the filling liquid from the sealed space.

As an example, in order that the separation distance between the light incidence surface 11 of the partially transmissive and partially reflective layer 1 and the light reflection surface 12 of the reflective layer 2 may be adjusted in real-time as required to adjust the intensity of light reflected by the rear-view mirror dynamically and to enhance the anti-dazzling effect to the largest extent, adding the filling liquid into the sealed space to enhance the separation distance or extracting the filling liquid from the sealed space to reduce the separation distance further includes:

detecting intensity of light reaching the partially transmissive and partially reflective layer 1; and determining whether the intensity is greater than a predetermined intensity threshold or not, and in response to the intensity greater than the predetermined intensity threshold, the filling liquid is added into the sealed space to enhance the separation distance between the partially transmissive and partially reflective layer 1 and the reflective layer 2; otherwise, in response to the intensity not greater than the predetermined intensity threshold, the filling liquid is extracted from the sealed space to reduce the separation distance between the light incidence surface 11 of the partially transmissive and partially reflective layer 1 and the light reflection surface 12 of the reflective layer 2.

Embodiments of the present disclosure may have any one of the following advantageous effects:

The rear-view mirror provided by the present disclosure, may in-time adjust the difference in optical path length between the light reflected by the partially transmissive and partially reflective layer and the light reflected by the reflective layer by means of adjusting the separation distance between the light incidence surface of the partially transmissive and partially reflective layer and the light reflection surface of the reflective layer in real-time by the separation distance adjusting device, so as to change the extent of the destructive interference of the reflected lights. In this way, it may adjust the actual reflectivity of the rear-view mirror, to adjust the intensity of light reflected by the rear-view mirror dynamically, to enhance the anti-dazzling effect and to improve safety of driving vehicle.

The method for adjusting reflectivity of the rear-view mirror provided by the present disclosure, may adjust the difference in optical path length between the light reflected by the partially transmissive and partially reflective layer and the light reflected by the reflective layer by means of adjusting the separation distance between the front surface of the partially transmissive and partially reflective layer and the front surface of the reflective layer in real-time, so as to change the extent of destructive interference produced by the reflected light. In this way, it may adjust the actual reflectivity of the rear-view mirror, so as to adjust the intensity of light reflected by the rear-view mirror dynamically, to enhance the anti-dazzling effect and to improve safety of driving vehicle.

It should be understood by the skilled person in the art that the present disclosure includes apparatuses arranged to implement one or more of operations in the present disclosure. These apparatuses may be specially designed and manufactured for desired specific purpose, or may also include known apparatuses in general purpose computers. These apparatuses have computer programs stored therein. These computer programs are activated or reconstructed selectively. Such computer programs may be stored in apparatus (for example computer) readable medium or stored in any types of media adapted to store electronic instructions and coupled to buses respectively. The computer readable media include, but not limited to, any types of discs (including soft discs, hard discs, optical discs, CD-ROM and magneto optical discs), ROM (Read-Only Memory), RAM (Random Access Memory), EPROM (Erasable Programmable Read-Only Memory), EEPROM (Electrically Erasable Programmable Read-Only Memory), flash memory, magnetic cards or optical cards. That is, the readable media include any media that store or transmit information in apparatus (for example computer) readable forms.

In embodiments of the present disclosure, the terms of "processor" may be implemented by one or more logic operation process circuits. The logic operation process circuit may be implemented as a processor, for example, a Central Processing Unit (abbreviated as CPU), an Application Specific Integrated Circuit (abbreviated as ASIC), a digital signal processor (abbreviated as DSP), a Field Programmable Gate Array (abbreviated as FPGA), a Single-chip Microcomputer (abbreviated as MCU), or the like.

Although the present disclosure has been explained with reference to the accompanied drawings, the embodiments shown in these drawings are intended to illustrate the embodiments of the present disclosure, instead of limiting the present disclosure. Scales in the drawings are only illustrative, instead of limiting the present disclosure.

It should be understood that the above exemplified embodiments are only provided for purpose of explaining the principles of the present disclosure; however, the present disclosure is not limited to this. All kinds of modifications and variants that can be made by the skilled person in the art without departing from the spirit and essence of the present disclosure will fall within the scope of the present disclosure.

What is claimed is:

1. A rear view mirror comprising:
    a partially transmissive and partially reflective layer which has a light incidence surface for receiving external light, wherein one part of the external light reaching the light incidence surface is reflected and the other part is transmitted through the partially transmissive and partially reflective layer; and
    a reflective layer arranged at a side of the partially transmissive and partially reflective layer opposite to the light incidence surface, the reflective layer having a light reflection surface which is configured to at least partly reflect the light having been transmitted through the partially transmissive and partially reflective layer back to the partially transmissive and partially reflective layer,
    wherein an optical distance between the light incidence surface of the partially transmissive and partially reflective layer and the light reflection surface of the reflective layer is adjustable to substantially change total reflection of the rear view mirror by light interference.

2. The rear-view mirror according to claim 1, wherein a separation distance between the light incidence surface of the partially transmissive and partially reflective layer and the light reflection surface of the reflective layer is adjustable.

3. The rear-view mirror according to claim 2, further comprising a separation distance adjusting device configured to adjust the separation distance between the light incidence surface of the partially transmissive and partially reflective layer and the light reflection surface of the reflective layer to change a phase difference between light reflected by the partially transmissive and partially reflective layer and light reflected by the reflective layer.

4. The rear-view mirror according to claim 3, wherein the separation distance adjusting device comprises a flexible connection belt, filling liquid and a storing and transporting device, and
    wherein the flexible connection belt is elastic and connected to a periphery of the partially transmissive and partially reflective layer and a periphery of the reflective layer, to form a sealed space between the partially transmissive and partially reflective layer and the reflective layer;
    wherein the sealed space is filled with the filling liquid; and
    wherein the storing and transporting device is configured to add the filling liquid into the sealed space or to extract the filling liquid from the sealed space.

5. The rear-view mirror according to claim 4, wherein the storing and transporting device comprises a two-way pump, a pipe and a filling liquid reservoir, and
    wherein a connection portion is provided on the flexible connection belt and two ends of the pipe are respectively connected to the connection portion and an output end of the two-way pump;

wherein the two-way pump has an input end connected to the filling liquid reservoir; and wherein the filling liquid reservoir is configured to store the filling liquid.

6. The rear-view mirror according to claim 4, wherein the filling liquid has a same refractivity as the partially transmissive and partially reflective layer.

7. The rear-view mirror according to claim 4, wherein the separation distance adjusting device further comprises a light intensity sensing device and a processor, wherein the light intensity sensing device is configured to detect an intensity of light reaching the partially transmissive and partially reflective layer, to convert the detected intensity into an electrical signal that is sent to the processor; and wherein the processor is configured to determine whether the intensity is greater than a predetermined intensity threshold from the electrical signal or not, and in response to the intensity being greater than the predetermined intensity threshold, the processor is configured to control the storing and transporting device to add the filling liquid into the sealed space to increase the separation distance between the partially transmissive and partially reflective layer and the reflective layer; otherwise, in response to the intensity not being greater than the predetermined intensity threshold, the processor is configured to control the storing and transporting device to extract the filling liquid from the sealed space to reduce the separation distance between the partially transmissive and partially reflective layer and the reflective layer.

8. The rear-view mirror according to claim 2, wherein the rear-view mirror has an actual reflectivity satisfying:

$$a \geq e \geq a - b^*c$$

where a is a reflectivity of the partially transmissive and partially reflective layer; b is a transmissivity of the partially transmissive and partially reflective layer; c is a reflectivity of the reflective layer; and e is the actual reflectivity of the rear-view mirror.

9. The rear-view mirror according to claim 1, wherein a separation distance between the light incidence surface of the partially transmissive and partially reflective layer and the light reflection surface of the reflective layer satisfies:

$$d = (\lambda/2 + m\lambda)/2n_2,$$

where $\lambda$ is a wavelength of visible light; $n_2$ is a refractivity of the light incidence surface of the partially transmissive and partially reflective layer; m is an integer; and d is the separation distance between the light incidence surface of the partially transmissive and partially reflective layer and the light reflection surface of the reflective layer.

10. The rear-view mirror according to claim 9, wherein the wavelength $\lambda$ of visible light is equal to 550 nm.

11. The rear-view mirror according to claim 2, wherein the separation distance between the light incidence surface of the partially transmissive and partially reflective layer and the light reflection surface of the reflective layer satisfies:

$$d = (\lambda/2 + m\lambda)/2n_2,$$

where $\lambda$ is a wavelength of visible light; $n_2$ is a refractivity of the light incidence surface of the partially transmissive and partially reflective layer; m is an integer; and d is the separation distance between the light incidence surface of the partially transmissive and partially reflective layer and the light reflection surface of the reflective layer.

12. The rear-view mirror according to claim 11, wherein the wavelength $\lambda$ of visible light is equal to 550 nm.

13. The rear-view mirror according to claim 4, wherein the separation distance between the light incidence surface of the partially transmissive and partially reflective layer and the light reflection surface of the reflective layer satisfies:

$$d = (\lambda/2 + m\lambda)/2n_2,$$

where $\lambda$ is a wavelength of visible light; $n_2$ is a refractivity of the light incidence surface of the partially transmissive and partially reflective layer; m is an integer; and d is the separation distance between the light incidence surface of the partially transmissive and partially reflective layer and the light reflection surface of the reflective layer.

14. The rear-view mirror according to claim 1, wherein an anti-reflection film is provided on the light incidence surface of the partially transmissive and partially reflective layer.

15. The rear-view mirror according to claim 1, wherein reflectivity of the reflective layer is adjustable.

16. The rear-view mirror according to claim 1, wherein the reflective layer comprises:

a reflective substrate;

an electrochromism reflective film arranged on the reflective substrate, wherein the electrochromism reflective film has reflectivity which is changeable depending on a voltage applied to the electrochromism reflective film.

17. The rear-view mirror according to claim 1, wherein a liquid crystal layer is provided between the partially transmissive and partially reflective layer and the reflective layer, and the liquid crystal layer has adjustable refractivity.

18. A method for adjusting reflectivity of a rear-view mirror according to claim 1, comprising:

adjusting a separation distance between the light incidence surface of the partially transmissive and partially reflective layer and the light reflection surface of the reflective layer to change a phase difference between light reflected by the partially transmissive and partially reflective layer and light reflected by the reflective layer.

19. The method according to claim 18, wherein adjusting the separation distance between the light incidence surface of the partially transmissive and partially reflective layer and the light reflection surface of the reflective layer comprises:

forming an expandable or shrinkable sealed space between the partially transmissive and partially reflective layer and the reflective layer;

filling the sealed space with filling liquid; and adding the filling liquid into the sealed space to increase the separation distance or extracting the filling liquid from the sealed space to reduce the separation distance.

20. The method according to claim 19, wherein adding the filling liquid into the sealed space to increase the separation distance or extracting the filling liquid from the sealed space to reduce the separation distance further comprises:

detecting intensity of light reaching the partially transmissive and partially reflective layer; and determining whether the intensity is greater than a predetermined intensity threshold or not, and in response to the intensity being greater than the predetermined intensity threshold, adding the filling liquid into the sealed space to increase the separation distance between the partially transmissive and partially reflective layer and the reflective layer; otherwise, in response to the intensity not being greater than the predetermined intensity threshold, extracting the filling liquid from the sealed space to reduce the separation distance between the partially transmissive and partially reflective layer and the reflective layer.

\* \* \* \* \*